INVENTOR
VICTOR W. FARRIS

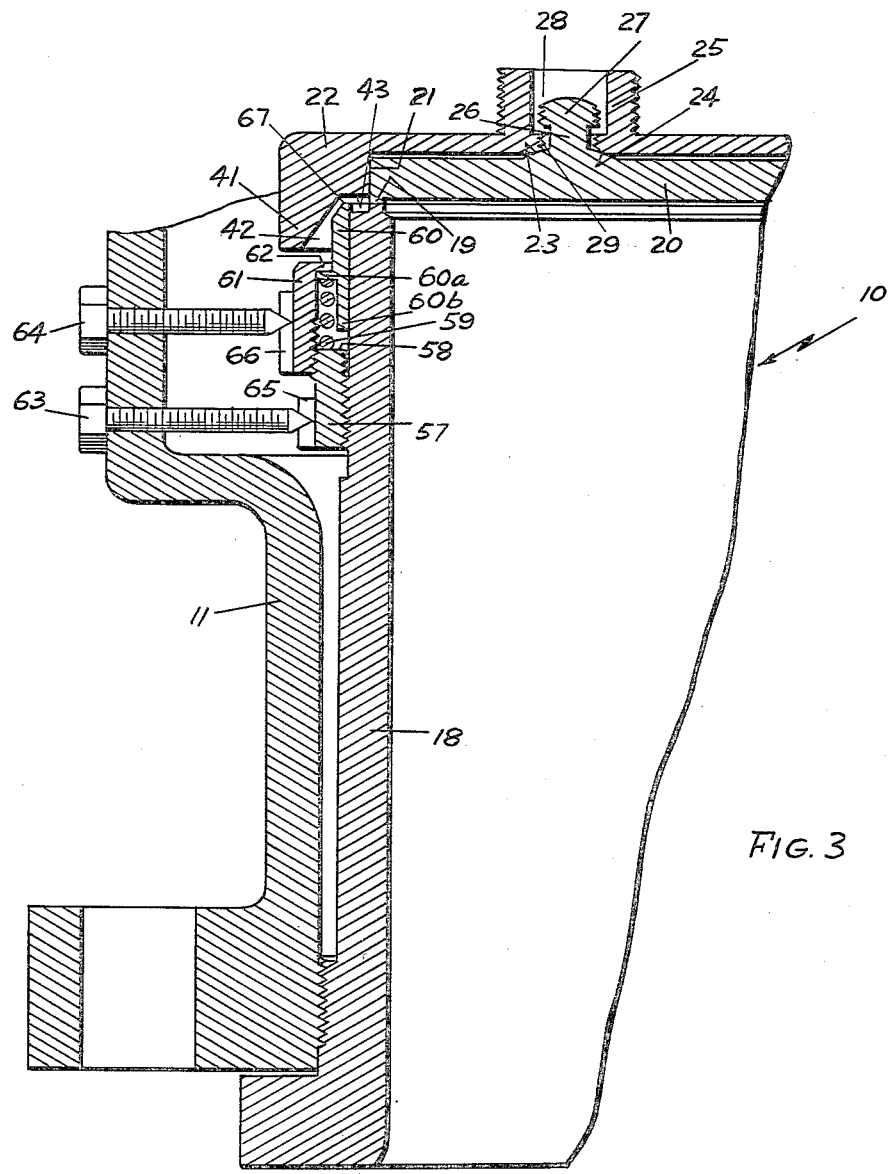

2,821,208
Patented Jan. 28, 1958

2,821,208

SAFETY VALVES

Victor Wallace Farris, Palisades Park, N. J.

Application October 19, 1955, Serial No. 541,364

6 Claims. (Cl. 137—478)

This invention relates to safety valves and particularly to safety valves having independent adjustments for controlling the warn and blow-down thereof.

In this invention, there is disclosed a safety valve comprising an inlet and exhaust port separated by a valve disc cooperating with a valve seat. A spring loaded blow-down ring cooperates with said valve disc and is movable with respect thereto. There is provided a first adjustment for controlling the initial relationship between said spring loaded blow-down ring and said valve disc prior to discharge of said valve, thereby presetting the warn of said valve. A second independent adjustment is provided for controlling the subsequent relationship between said spring loaded blow-down ring and said valve disc during discharge of said valve, thereby presetting the blow-down of said valve.

Heretofore valves have been constructed with only a single blow-down adjustment. The difficulty that exists with such a valve is that if the ring is moved down, the gap between it and the valve disc is large and the warn is long, but since the ring is down, the blow-down is short. Conversely, if the ring is adjusted high, the gap is small and the warn is short, but since the ring is high, the blow-down is long. In an effort to overcome the limitations of having only a single adjustment, the blow-down ring has had to be set at some compromise position and external means such as high velocity nozzles, are used to overcome the limitations of the single adjustment. This has not been found to be satisfactory.

In this invention, the adjustments for warn and blow-down are independent of each other and also independent with respect to the velocity of the fluid at the inlet port. A previously constructed valve having a two inch diameter inlet port would have to have said port reduced to a one inch diameter nozzle opening in order to achieve the needed high velocity. In a valve constructed in accordance with the principles of this invention, a two inch diameter inlet port need not be reduced but can be constructed to maintain the same dimension for both inlet and exhaust ports. An immediate consequence of this invention is that it is now possible to construct, for example, a two inch valve that will do the work of a present day four inch valve.

Further objects and advantages of this invention will be apparent as the description progresses, reference being made to the accompanying drawings wherein:

Fig. 3 is an enlarged sectional view of a fragment of a safety valve illustrating a second embodiment of the invention.

Figure 1:
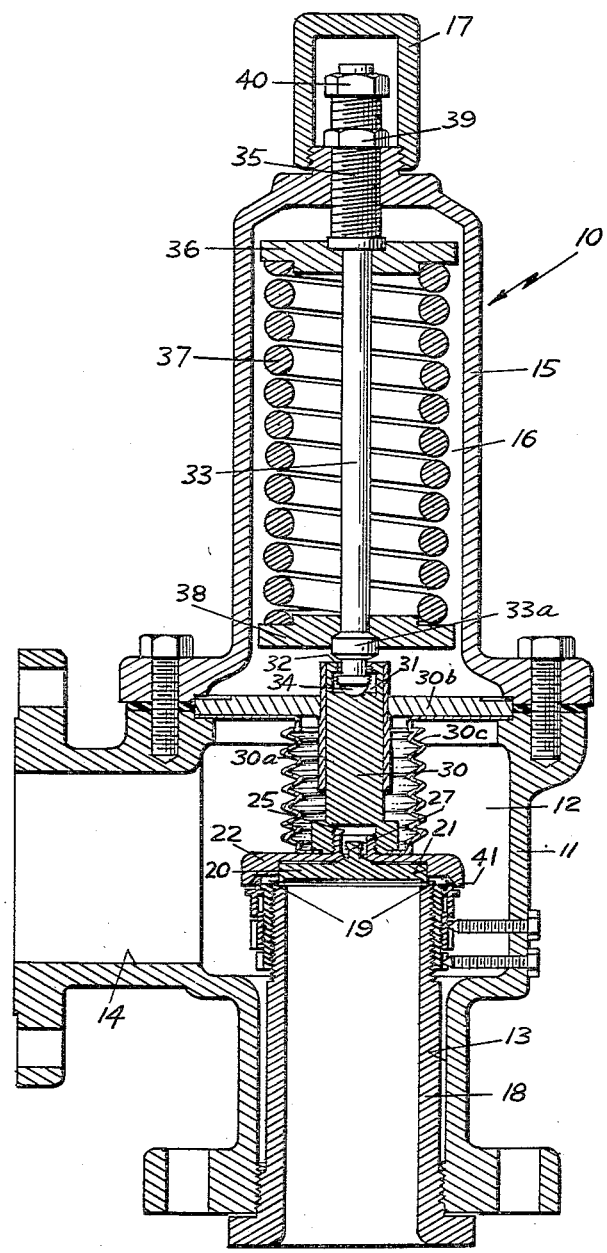
Fig. 1 is a vertical sectional view taken substantially through the center of a safety valve illustrating a first embodiment of the invention.
Figure 2:
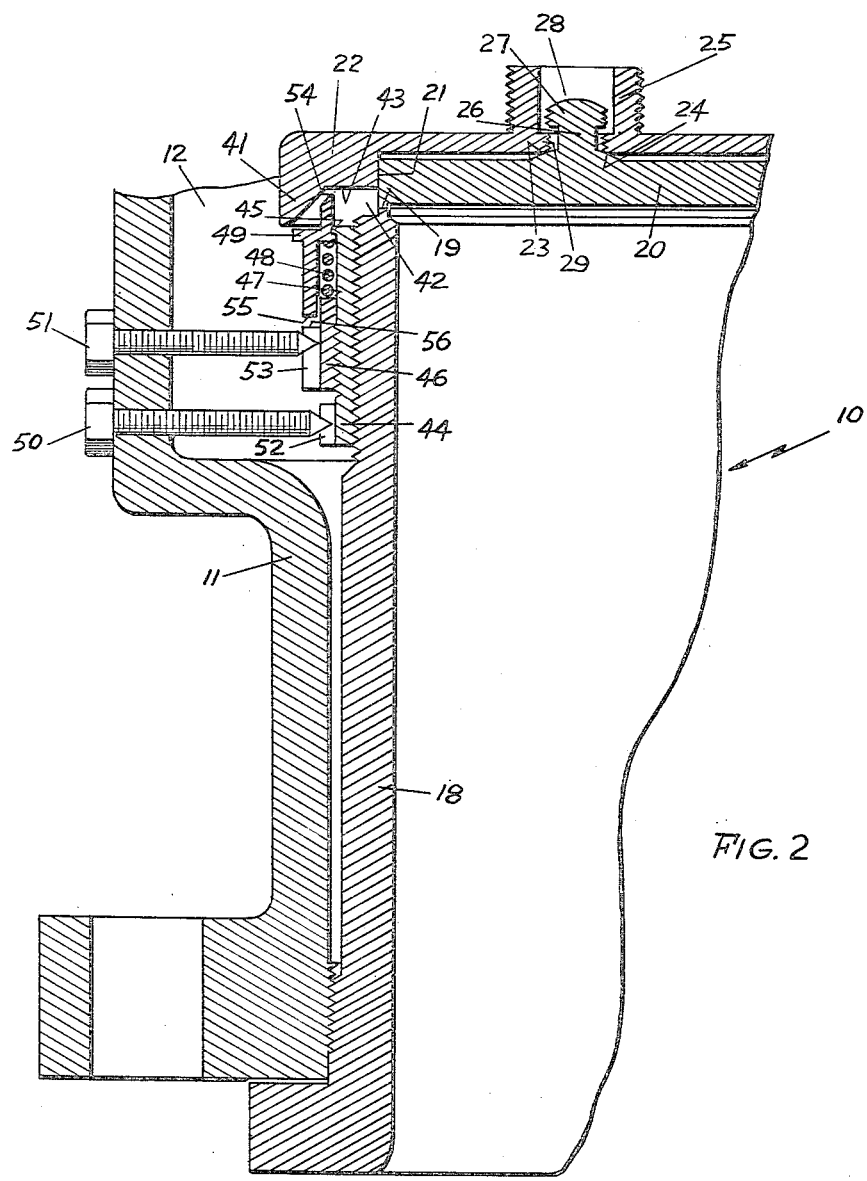
Fig. 2 is an enlarged, similar view of the blow-down ring assembly illustrated in Figure 1.

Referring now to Figures 1, 2 and 3 there is shown a safety valve 10 including a valve body 11 having a central chamber 12. A bonnet 15 is mounted on said valve body 11 and provides a spring chamber 16. A cap 17 is secured at the upper end of said bonnet 15. Threadedly engaged in the inlet port 13, and extending into the central chamber 12 of the body 11, is a straight nozzle 18, one end of which presents a valve seat 19.

Cooperating with the seat 19 is a valve disc 20, said disc being disposed in a recess 21 formed in the underside of a disc-holding member 22. The upper surface of the disc 20 is provided with a spherical portion 23 adapted slidingly to engage in a concavity 24 formed in the under surface of a coupling member 25 integral with the disc holding member 22.

Rising from the center of the spherical portion 23 of the disc 20 is a rod-like extension 26 having at the outer end thereof an enlarged threaded head or ball 27, and formed in the coupling member 25 is a socket or recess 28 which is larger than said head 27 and which is adapted to receive the same through a reduced threaded bore 29. Thus a ball-and-socket connection or universal joint is provided between the disc 20 and the disc-holding member 22, thereby permitting relative movement between these elements. Therefore should the disc-holding member become misaligned in the valve, the disc has sufficient freedom of movement to locate itself and come home true on the seat 19.

Threadedly engaged with the end of the coupling member 25 opposite to that provided with the threaded bore 29 is a disc guide 30 having at its outer end a socket or recess 31 communicating with the exterior through a smaller threaded bore 32. The disc guide 30 is slidably mounted in a sleeve 30a mounted in a baffle 30b secured between the valve body 11 and the bonnet 15. A bellows 30c may have one end thereof secured between the baffle 30b and the body 11 and the other end thereof secured between the disc guide 30 and the disc holding member 22.

A valve stem 33 has an enlarged threaded head 34 formed at its lower end, said head being disposed in the socket 31 of the disc guide 30. The upper end of the stem 33 is slidably mounted in a spring-adjusting screw 35 threaded in the bonnet 15. The lower end of the screw 35 engages a button 36 which bears against the upper end of a spring 37 the lower end of which urges another button 38 into contact with an enlargement 33a formed on the stem 33. The screw 35 may, after adjusting the tension of the spring 37, be locked by a lock nut 39.

Threaded on the upper end of the screw 35 is another lock nut 40 adapted to engage a manual control (not shown) for test lifting the valve disc 20.

Surrounding the disc 20 and formed on the holding member 22 is a depending flange 41, said flange having an interior surface 42 which flares outwardly from a flat, secondary disc area 43 presented by the undersurface of the holding member 22, in a direction opposite to the flow of fluid through the nozzle 18.

Referring now more particularly to Fig. 2 which illustrates the gist of the first embodiment of the invention, there is shown a first ring 44 threadedly engaged on the nozzle 18 of inlet port 13, said first ring 44 having at its upper end a lip 45. A second ring 46, threadedly engaged on the first ring 44, has a bearing surface 47 that contacts a spring 48 which in turn urges against a blow-down ring 49. Both the ring 44 and the ring 46, after suitable adjustment, can be fixed in position by locking screws 50 and 51 that are carried in the valve body 11 and engageable, respectively, with serrations 52 and 53 formed about said rings.

The aforementioned advantages of the present invention are achieved since the two adjustments for warn and blow-down are now independent of each other. In the valve illustrated in Figures 1 and 2, the warn adjustment, which is the length of the gap between the secondary disc area 43 on disc holding member 22 and an extension 54 on blow-down ring 49, is adjusted first. Locking screw 50 is loosened and ring 44 is moved until the extension 54 on blow-down ring 49 actually contacts the secondary disc area 43, after which ring 44 is backed off, leaving the smallest gap which will result in practically no warn. The lip 45 on ring 44 limits the highest point to which the blow-down ring 49 can move in a vertical direction. Locking screw 50 is then tightened into engagement with serrations 52 on ring 44. Having secured the warn adjustment, it is now possible to adjust the blow-down, which is the lowest point to which blow-down ring 49 can move, said distance being measured between the lower end 55 of blow-down ring 49 and upper surface 56 of serrations 53 on second ring 46. The blow-down is adjusted by loosening screw 51 and rotating ring 46 until the gap between the blow-down ring 49 and surface 56 is such that said blow-down ring is free to move the desired amount below the seating surface 19. It can now be seen that the adjustments for warn and blow-down are separate and independent.

Referring now to Figure 3 which illustrates a second embodiment of the invention, there is shown a first ring 57 threadedly engaged to nozzle 18 of inlet port 13. The upper surface 58 of said ring 57 bears against a spring 59 which, in turn, forces a blow-down ring 60 to be urged against a second ring 61 which is threadedly engaged to ring 57. The second ring 61 has a suitable lip 62 that bears against a lateral extension 60a of the blow-down ring 60 and thereby limits its vertical travel. Both rings 57 and 61, after suitable adjustment, can be fixed in position by locking screws 63 and 64 that are carried in the valve body 11 and engageable respectively, with serrations 65 and 66 formed about said rings.

The warn adjustment for the valve illustrated in Figure 3 is the extent of the gap between the upper end 67 of blow-down ring 60 and secondary disc area 43 on the disc holding member 22 and the blow-down adjustment is the distance between the lower end 60b of blow-down ring 60 and upper surface 58 on ring 57. In this embodiment, the warn adjustment is controlled by ring 61 and the blow-down adjustment is controlled by ring 57. Locking screw 64 is loosened and ring 61 is rotated until blow-down ring 60 just contacts secondary disc area 43 at which point ring 61 is rotated until blow-down ring 60 is backed off leaving a very small gap. Screw 64 is tightened and screw 63 is loosened, thereby allowing ring 57 to be rotated until a sufficient gap exists between surface 58 on ring 57 and lower end 60b of blow-down ring 60 which will allow said blow-down ring to retract the desired amount below seat 19. After ring 57 is adjusted, screw 63 is tightened.

The operation of both embodiments is the same in that when the pressure of the fluid acting against the disc 20 is sufficient to cause said disc to begin to rise, discharge commences. As the fluid passes through the primary orifice bounded by the outer edge of the disc 20 and seat 19, said fluid acts against a surface augmented by the area of the secondary surface 43 which, in turn, is limited by the raised blow-down ring. It is the raised blow-down ring, in limiting this increased area for the static pressure to operate upon, that allows a greater initial force to be developed against the spring load of the valve, thereby resulting in almost immediate achievement of maximum lift.

Once the valve seat has been completely opened, the static pressure becomes a dynamic pressure, which operates upon the blow-down ring thereby causing said blow-down ring, which is held up only by light spring pressure, to be forced down into a retracted position that was pre-set by the blow-down adjustment. Since, on blow-down, the blow-down ring is completely withdrawn, there is provided a condition for speedy closing of the valve.

This completes the description of the embodiments of the invention illustrated herein. However, many modifications and advantages thereof will be apparent to persons skilled in the art without departing from the spirit and scope of this invention. Accordingly, it is desired that this invention not be limited to the particular details of the embodiments disclosed herein, except as defined by the appended claims.

What is claimed is:

1. A safety valve comprising inlet and exhaust ports separated by a valve disc cooperating with a valve seat, a spring loaded blow-down ring cooperating with said valve disc and being movable with respect thereto, a first ring attached to and movable with respect to said inlet port for controlling a first relationship between said spring loaded blow-down ring and said valve disc prior to discharge of said valve, a second ring attached to and movable with respect to said first ring for controlling a second relationship between said blow-down ring and said valve disc during discharge of said valve, and first and second locking devices independent of each other for maintaining the pre-set adjustments of said first and second rings.

2. A safety valve comprising inlet and exhaust ports separated by a valve disc cooperating with a valve seat, a spring loaded blow-down ring cooperating with said valve disc and being movable with respect thereto, a first ring threadedly engaged to said inlet port for controlling a first relationship between said spring loaded blow-down ring and said valve disc prior to discharge of said valve, a second ring threadedly engaged to said first ring for controlling a second relationship between said blow-down ring and said valve disc during discharge of said valve, and first and second locking devices independent of each other for maintaining the pre-set adjustments of said first and second rings.

3. A safety valve comprising inlet and exhaust ports separated by a valve disc cooperating with a valve seat, a spring loaded blow-down ring cooperating with said valve disc and being movable with respect thereto, a first ring threadedly engaged to said inlet port for controlling the initial relationship between said spring loaded blow-down ring and said valve disc prior to discharge of said valve, to thereby pre-set the warn of said valve, a second ring threadedly engaged to said first ring for controlling the subsequent relationship between said blow-down ring and said valve disc during discharge of said valve, to thereby pre-set the blow-down of said valve, and first and second locking devices independent of each other for maintaining the pre-set adjustments of said first and second rings.

4. A safety valve comprising inlet and exhaust ports separated by a valve disc cooperating with a valve seat, a spring loaded blow-down ring cooperating with said valve disc and being movable with respect thereto, a first ring threadedly engaged to said inlet port for controlling the subsequent relationship between said blow-down ring and said valve disc during discharge of said valve, to thereby pre-set the blow-down of said valve, a second ring threadedly engaged to said first ring for controlling the initial relationship between said spring loaded blow-down ring and said valve disc prior to discharge of said valve, to thereby pre-set the warn of said valve, and first and second locking devices independent of each other for maintaining the pre-set adjustments of said first and second rings.

5. A safety valve comprising inlet and exhaust ports separated by a valve disc cooperating with a valve seat, a first ring threadedly engaged to said inlet port and movable with respect thereto, a second ring threadedly engaged to said first ring and movable with respect thereto, a movable blow-down ring urged against a stop on said first ring by a spring interposed between the upper portion of said second ring and the lower portion of said blow-down ring, said first ring controlling the initial gap between said blow-down ring and said valve disc prior to discharge of said valve, to thereby pre-set the warn of said valve, said second ring controlling the subsequent relationship between said blow-down ring and said valve disc during discharge of said valve, to thereby pre-set the blow-down of said valve, and first and second locking devices independent of each other for maintaining the pre-set adjustments of said first and second rings.

6. A safety valve comprising inlet and exhaust ports separated by a valve disc cooperating with a valve seat, a first ring threadedly engaged to said inlet port and movable with respect thereto, a second ring threadedly engaged to said first ring and movable with respect thereto, a movable blow-down ring urged against a stop on said second ring by a spring interposed between the upper portion of said first ring and the lower portion of said blow-down ring, said second ring controlling the initial gap between said blow-down ring and said valve disc prior to discharge of said valve, to thereby pre-set the warn of said valve, said first ring controlling the subsequent relationship between said blow-down ring and said valve disc during discharge of said valve, to thereby pre-set the blow-down of said valve, and first and second locking devices independent of each other for maintaining the pre-set adjustments of said first and second rings.

References Cited in the file of this patent

UNITED STATES PATENTS 2,261,461    Falls ------------------ Nov. 4, 1941